(12) United States Patent
Ahearn (10) Patent No.: US 10,448,552 B2
(45) Date of Patent: Oct. 22, 2019

(54) GARDENING TOOL

(71) Applicant: Conor Mills Ahearn, Grosse Pointe, MI (US)

(72) Inventor: Conor Mills Ahearn, Grosse Pointe, MI (US)

( * ) Notice: Subject to any disclaimer, the term of this patent is extended or adjusted under 35 U.S.C. 154(b) by 298 days.

(21) Appl. No.: 15/170,317

(22) Filed: Jun. 1, 2016

(65) Prior Publication Data

US 2017/0347517 A1 Dec. 7, 2017

(51) Int. Cl.
*A01B 1/02* (2006.01)
*A01B 1/22* (2006.01)
(Continued)

(52) U.S. Cl.
CPC .............. *A01B 1/227* (2013.01); *A01B 1/022* (2013.01); *A01B 1/026* (2013.01); *A01B 1/08* (2013.01); *A01C 5/02* (2013.01); *B25F 1/02* (2013.01); *B25G 1/01* (2013.01); *B25G 1/04* (2013.01); *B25G 1/06* (2013.01); *B25G 1/10* (2013.01);
(Continued)

(58) Field of Classification Search
CPC .. A01B 1/00; A01B 1/02; A01B 1/022; A01B 1/227; A01B 1/026; B25G 1/00; B25G 1/102; B25G 1/10; B25G 1/04; B25G 1/06; B25G 3/12; B25G 3/36
See application file for complete search history.

(56) References Cited

U.S. PATENT DOCUMENTS 25,818 A * 10/1859 Goodall ................ B26B 27/007
30/298
712,843 A 11/1902 Paul
(Continued)

FOREIGN PATENT DOCUMENTS

CN 104420488 A 3/2015
GB 2183433 A 6/1987 ............... A01C 5/02
(Continued)

OTHER PUBLICATIONS

Blaine R. Copenheaver, Authorized officer Commissioner for Patents, USPTO, International Search Report—Application No. PCT/US2017/032618, dated Jul. 31, 2017, 11 pages, together with the Written Opinion of the International Searching Authority.
(Continued)

*Primary Examiner* — Jessica H Lutz
(74) *Attorney, Agent, or Firm* — Sunstein Kann Murphy & Timbers LLP (57) ABSTRACT

A gardening tool includes an elongated body having a first end and a second end. An arm attachment portion is coupled substantially at the first end of the elongated body. The arm attachment portion is configured to at least partly wrap around a user's forearm. The tool also includes a pivotally adjustable handle that is coupled to and extends substantially laterally from the elongated body. The handle is disposed between the first and the second end of the elongated body. The tool further includes a pad that is coupled to the elongated body. The pad is disposed between the handle and the arm attachment portion, and its position is adjustable (Continued)

along a longitudinal axis of the elongated portion. A adapter mechanism is disposed at the second end of the elongated body. The adapter mechanism is configured to allow for interchanging of gardening tool heads.

14 Claims, 6 Drawing Sheets (51) Int. Cl.
*A01B 1/08* (2006.01)
*A01C 5/02* (2006.01)
*B25G 1/04* (2006.01)
*B25G 1/06* (2006.01)
*B25G 1/10* (2006.01)
*B25G 3/12* (2006.01)
*B25G 3/36* (2006.01)
*B25F 1/02* (2006.01)
*B25G 1/01* (2006.01)
*B25G 3/04* (2006.01)
*B25G 3/16* (2006.01)
*B25G 3/28* (2006.01)

(52) U.S. Cl.
CPC ............ *B25G 1/102* (2013.01); *B25G 3/04* (2013.01); *B25G 3/12* (2013.01); *B25G 3/16* (2013.01); *B25G 3/28* (2013.01); *B25G 3/36* (2013.01)

(56) References Cited

U.S. PATENT DOCUMENTS

| | | | | |
|---|---|---|---|---|
| 2,482,589 A | | 9/1949 | Maguire | 294/58 |
| 2,660,457 A | * | 11/1953 | Mallon | A47L 9/244 15/334 |
| 2,901,258 A | * | 8/1959 | Brandafi | B23B 31/113 279/97 |
| 4,179,805 A | * | 12/1979 | Yamada | B27B 17/0008 172/41 |
| 4,247,216 A | * | 1/1981 | Pansini | B25G 3/18 15/1.7 |
| 4,518,162 A | * | 5/1985 | Oates | A63B 21/072 403/349 |
| 4,758,023 A | * | 7/1988 | Vermillion | F16L 37/252 285/401 |
| 4,829,857 A | * | 5/1989 | Jones | B25L 323/16 16/422 |
| 4,888,846 A | | 12/1989 | Natale | 15/236.01 |
| 4,924,924 A | | 5/1990 | Stewart | 142/49 |
| 4,930,181 A | | 6/1990 | Johnson | |
| 4,943,182 A | * | 7/1990 | Hoblingre | F16B 7/20 403/325 |
| 4,986,690 A | * | 1/1991 | Cooksey | E21B 17/02 403/27 |
| 5,054,830 A | * | 10/1991 | Nisenbaum | B25G 1/00 16/426 |
| 5,228,610 A | * | 7/1993 | Spence | B25F 5/021 224/267 |
| 5,275,068 A | * | 1/1994 | Wrench | A01B 1/22 30/296.1 |
| 5,365,648 A | * | 11/1994 | Fuga | B25B 27/02 29/254 |
| 5,379,758 A | | 1/1995 | Snyder | 128/20 |
| 5,451,085 A | * | 9/1995 | Wagner | A01B 1/22 16/422 |
| 5,455,981 A | * | 10/1995 | Wiese | A47L 13/022 15/143.1 |
| 5,471,698 A | * | 12/1995 | Francis | A47L 13/08 15/144.1 |
| 5,499,852 A | * | 3/1996 | Seigendall | A01B 1/026 294/54.5 |
| 5,529,357 A | * | 6/1996 | Hoffman | A01B 1/026 15/145 |
| 5,716,087 A | * | 2/1998 | Backich | A01B 1/02 16/422 |
| D391,461 S | * | 3/1998 | Smoak | D8/8 |
| 5,813,206 A | | 9/1998 | McKittrick | 56/400.01 |
| 5,890,259 A | * | 4/1999 | Sarac | A01B 1/00 16/422 |
| 5,937,627 A | | 8/1999 | McKittrick | 56/400.01 |
| 6,082,795 A | * | 7/2000 | Fornelli | A01B 1/00 16/422 |
| 6,126,359 A | * | 10/2000 | Dittrich | A61B 17/29 403/325 |
| 6,435,284 B1 | | 8/2002 | Aman | 172/371 |
| 6,464,272 B1 | * | 10/2002 | Michaud | A01B 1/026 16/430 |
| 6,564,389 B1 | * | 5/2003 | Laughlin | A41D 19/01529 2/158 |
| 6,598,266 B1 | | 7/2003 | Elliott | 16/430 |
| D481,287 S | | 10/2003 | Crist | D8/98 |
| 6,669,397 B1 | * | 12/2003 | Christion | B25G 3/00 15/105 |
| 6,698,064 B1 | | 3/2004 | Graj et al. | 16/430 |
| 6,786,491 B2 | * | 9/2004 | Carbonneau | B25D 1/16 279/89 |
| 6,880,251 B2 | * | 4/2005 | Gambert | A01D 34/902 30/276 |
| 6,925,686 B2 | * | 8/2005 | Heathcock | B25G 1/04 15/144.4 |
| 7,032,941 B2 | * | 4/2006 | Heneveld | A01B 1/225 294/51 |
| 7,234,733 B2 | * | 6/2007 | Valentini | A47L 9/0072 15/321 |
| 7,653,970 B1 | * | 2/2010 | Lai | B25G 3/12 16/422 |
| D625,970 S | | 10/2010 | Tinius | D8/1 |
| D625,971 S | | 10/2010 | Tinius | D8/1 |
| 7,837,641 B2 | * | 11/2010 | Hoffman | A61F 5/05866 602/20 |
| 8,372,121 B2 | * | 2/2013 | Capote | A61B 17/7091 606/246 |
| 8,382,179 B2 | * | 2/2013 | Hamilton | G05G 1/04 294/210 |
| 8,418,321 B1 | | 4/2013 | Heiman | |
| 8,453,663 B2 | * | 6/2013 | Zordan | A61H 3/02 135/65 |
| D690,183 S | | 9/2013 | Lee | D8/107 |
| 8,757,688 B1 | * | 6/2014 | Hajek | A01B 1/026 294/57 |
| 8,776,648 B2 | | 7/2014 | Lee | 81/489 |
| 9,149,925 B1 | | 10/2015 | Van Valin | 294/25 |
| 9,662,779 B1 | * | 5/2017 | Yancey | B25G 1/102 |
| 9,757,851 B2 | * | 9/2017 | Meinzer | B25F 1/02 |
| 2003/0074765 A1 | | 4/2003 | Quimby | A01B 1/00 16/426 |
| 2004/0007887 A1 | * | 1/2004 | Elliott | A01B 1/00 294/58 |
| 2005/0194157 A1 | | 9/2005 | Hurt | 172/371 |
| 2006/0174449 A1 | * | 8/2006 | Hughes | A61F 4/00 16/430 |
| 2006/0242797 A1 | | 11/2006 | Czuwala | 16/430 |
| 2007/0209488 A1 | * | 9/2007 | Nogueras | B25G 1/102 81/489 |
| 2008/0259615 A1 | * | 10/2008 | Chien | H04N 5/2354 362/382 |
| 2013/0269131 A1 | * | 10/2013 | Mallett | A46B 5/00 15/144.1 |
| 2014/0138280 A1 | | 5/2014 | Meinzer et al. | |
| 2015/0367499 A1 | * | 12/2015 | Arketa Zabala | A47L 13/46 15/143.1 |

(56) References Cited

U.S. PATENT DOCUMENTS

2016/0353651 A1* 12/2016 Pritchett, II ........... A01B 1/026
2017/0001296 A1* 1/2017 Murphy .................. B25G 1/06

FOREIGN PATENT DOCUMENTS

| GB | 2248034 A | 3/1992 | ............... B25G 1/10 |
| GB | 2298158 A | 8/1996 | ............... A01B 1/00 |
| WO | WO 2009/136150 A1 | 11/2009 | ............... A01B 1/02 |

OTHER PUBLICATIONS

Stone, "Exoskeletal Yard Tools," Tech Briefs, 6 pages, Dec. 17, 2015.

* cited by examiner

GARDENING TOOL

FIELD OF THE INVENTION

The invention generally relates to gardening and, more particularly, the invention relates to tools having auxiliary features for those with mobility limitations.

BACKGROUND OF THE INVENTION

Gardening is an activity that provides a number of physical and mental benefits. According to the Centers for Disease Control and Prevention, walking and gardening are the most popular physical activities among adults age 65 and older. Unfortunately, many of these individuals suffer from underlying health conditions and mobility issues that make it difficult to garden. Arthritis is one such condition, and is estimated to affect one out of five adults in the United States. Approximately 52.5 million adults in the United States suffer from arthritis and are unable to garden without discomfort.

SUMMARY OF VARIOUS EMBODIMENTS

In accordance with one embodiment of the invention, a gardening tool includes an elongated body having a first end and a second end. An arm attachment portion is coupled substantially at the first end of the elongated body. The arm attachment portion is configured to at least partly wrap around a user's forearm. The tool also includes a pivotally adjustable handle that is coupled to and extends substantially laterally from the elongated body. The handle is disposed between the first and the second end of the elongated body. The tool further includes a pad that is coupled to the elongated body. The pad is disposed between the handle and the arm attachment portion, and its position is adjustable along a longitudinal axis of the elongated portion. An adapter mechanism is disposed at the second end of the elongated body. The adapter mechanism is configured to allow for interchanging of gardening tool heads.

The adapter mechanism may be spring loaded. The adapter mechanism may include a first portion on the tool head and a second portion on the elongated body. The user can release the tool head from the gardening tool by applying a force on the tool head directed substantially towards the first end. The user then applies a rotational force on the tool head directed substantially around the longitudinal axis of the elongated body. The user may then apply a force on the tool head directed substantially away from the first end. In some embodiments, the user may additionally, or alternatively, press a release button to release the tool head.

The position of one or more of the handle, the pad and the arm attachment portion may be adjustable along a longitudinal axis of the gardening tool. The length of the elongated body may be adjustable. In some embodiments, adjusting the length of the elongated body moves at least one of the arm attachment portion, the handle, the pad, or the adapter mechanism relative to the others. Furthermore, the handle may be pivotally adjustable while translationally fixed on the elongated body.

In some embodiments, the arm attachment portion comprises a strap. The strap may wrap around the user's arm. To that end, the strap may include Velcro.

In accordance with an embodiment of the invention, a method of gardening provides a gardening tool. The gardening tool includes an elongated body having a first end and a second end. An arm attachment portion configured to at least partly wrap around a user's forearm is coupled to the elongated body, and the arm attachment portion is disposed substantially at the first end of the elongated body. The tool also includes a pivotally adjustable handle coupled to and extending substantially laterally from the elongated body. The handle is disposed between the first end and the second end of the elongated body. The gardening tool may also include a pad coupled to the elongated body. The pad may be disposed between the handle and the arm attachment portion, and the position of the pad may be adjustable along a longitudinal axis of the elongated body. An adapter mechanism may be disposed at the second end of the elongated body, the adapter mechanism may be configured to allow for interchanging of gardening tool heads. The method attaches a user's arm to the arm attachment portion and rests the user's arm on the pad. The user grips the handle with his/her hand and applies a force to the gardening tool.

In some embodiments, the handle is configured to be gripped with a neutral hand grip. The user may adjust the pivot of the handle and/or the length of the elongated body. The gardening tool also may have LED lights that may be activated by a user.

To release the tool head, the user may apply a force on the tool head directed substantially towards the first end, apply a rotational force on the tool head directed substantially around the longitudinal axis of the elongated body, and apply a force on the tool head directed substantially away from the first end. In some embodiments, the user may also release the tool head by pressing a release button.

In accordance with another embodiment, a gardening tool includes an elongated body having a first end and a second end. A first handle is coupled to and extends substantially laterally from the elongated body. The handle is adjustable and is disposed between the first end and the second end of the elongated body. The tool also includes a second handle disposed substantially at the first end. The tool may also have an adapter mechanism configured to allow for interchanging of gardening tool heads disposed at the second end of the elongated body.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

In illustrative embodiments, a gardening tool has a number of features that work alone and in combination to assist with daily gardening activities. These features may assist those suffering from injury and/or mobility issues caused by arthritis (e.g., arthritis of the wrist). The gardening tool may have an arm attachment portion configured to couple with a user's forearm. Additionally, the tool may have a pad on which a user's arm may rest. The tool may also have a handle that extends laterally from the body of the tool. The user may be able to grip the handle with a neutral hand grip. The tool further may include an adapter mechanism that allows for rapid interchanging of tools with the user's free hand. Details of illustrative embodiments are discussed below.

Figure 1:
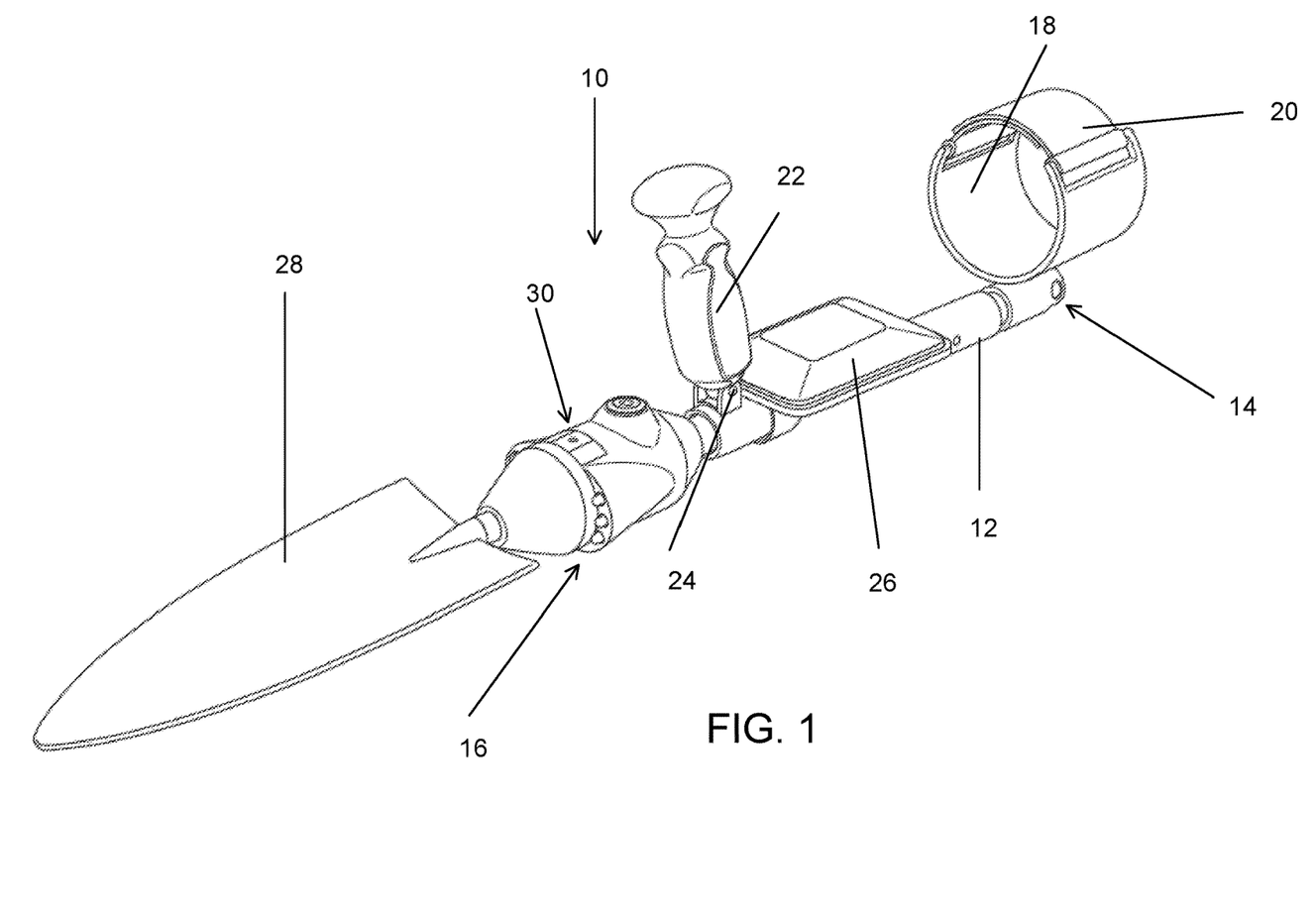
FIG. 1 is a perspective view of a gardening tool in accordance with illustrative embodiments of the invention.

FIG. 1 is a perspective view of a gardening tool 10 in accordance with illustrative embodiments of the invention. The gardening tool 10 has an elongated body 12 with a first end 14 (also referred to as "proximal end 14") and a second end 16 (also referred to as "distal end 16"). Coupled to the second end 16 is a tool head 28. In some embodiments, the tool head 28 is interchangeable. To that end, the tool 10 has an adapter mechanism 30 that allows for interchanging of tool heads 28.

While gardening, users frequently apply axial and rotational forces on the tool 10. With conventional gardening tools, the application of forces and moments on the tool are relayed through and around the joints of the wrist. For example, the wrist frequently undergoes radial flexion and/or ulnar flexion, which may be painful for those suffering from mobility conditions (e.g., arthritis of the wrist). Performing common gardening tasks using conventional gardening tools can be impractical for this mobility-limited population segment. Accordingly, it would be beneficial to have a gardening tool that reduces user discomfort.

The gardening tool 10 has a number of features that assist with common gardening tasks. For example, in some embodiments, the gardening tool 10 has an arm attachment portion 18 disposed substantially at its first end 14. The arm attachment portion 18 secures the arm of the user to the gardening tool 10. As a result, accidental slipping and dropping of the tool 10 is mitigated. Furthermore, the arm attachment portion 18 allows the user to leverage the strength of their upper arm while controlling the tool 10. By using the strength of the upper arm to help leverage the tool 10, the application of force at the wrist joint is minimized.

The arm attachment portion 18 may attach to a variety of locations on the arm of the user. Preferably, the arm attachment portion 18 is configured to attach around the forearm of a user. To that end, in some embodiments, the arm attachment portion 18 may include a cuff or a Velcro strap 20. As shown, the strap 20 may be adjustable to accommodate various forearm sizes and may also be padded for additional comfort. The strap 20 may be coupled to the elongated body 12 substantially at the first end 14, or anywhere else along the elongated body 12. Furthermore, some embodiments may have multiple arm attachment portions 18. It should be understood that while the arm attachment portion 18 is shown as including strap 20, this is not intended to limit all illustrative embodiments of the arm attachment portion 18. The arm attachment portion 18 may be any suitable arm attachment mechanism known to those having skill in the art.

To further provide user comfort and functionality, the gardening tool 10 may also have a handle 22. The handle 22 allows the user to obtain a comfortable grip on the tool 10 without requiring excessive stress on the wrist (e.g., excessive radial flexion and/or ulnar flexion). To that end, the handle 22 extends substantially laterally from the elongated body 12. In preferred embodiments, the handle 22 is longitudinally aligned with the arm attachment portion 18 as shown in the figure. This alignment helps maintain the user's wrist in a neutral position. Accordingly, the user is able to maintain a neutral grip on the handle 22 while using the tool 10 and minimize discomfort associated with gripping conventional gardening tools. Additionally, the handle 22 may be pivotally adjustable to further enhance user comfort and preference. Specifically, the handle 22 may pivot back and forth around a pivot axis 24 (see FIG. 2). In some embodiments, the user may lock the handle 22 in place at a desired pivot angle.

As mentioned above, the handle 22 helps maintain wrist neutrality while the user applies force to the tool 10 (e.g., while performing common gardening tasks). To that end, the surface of the handle 22 may be contoured to facilitate hand grip and user comfort. The handle 22 may be made of a number of materials including, for example, wood, plastics (e.g., polypropylene, and/or fiber reinforced plastics), aluminum and/or stainless steel.

Additionally, in some embodiments, a pad 26 is coupled to the elongated body 12. As the user grips the handle 22 with a neutral grip, the user's wrist is supported by the pad 26. In some other embodiments, the user's forearm may be supported on the pad 26. The pad 26 may be disposed between the handle 22 and the arm attachment portion 18. However, the location of the pad 26 on the elongated body 12 is adjustable. For example, the pad 26 may be moved closer to the handle 22 to provide wrist support. In some other embodiments, the pad 26 may be moved closer to the arm attachment portion 18 to provide forearm support. In further embodiments, the length of the pad 26 may extend substantially all the way from the handle 22 to the arm attachment portion 18 to provide a larger range of support. Additionally, the location of the pad 26 may be adjustable to accommodate different length arms.

Furthermore, the pad 26 may be waterproof and/or water resistant to help withstand conditions encountered in outdoor gardening (e.g., watering plants and/or weather). To that end, the pad 26 may be formed from a number of materials including, for example, shock absorbing material such as sponge rubber and/or low-resistance polyurethane foam (commonly referred to as memory foam). The pad 26 may also come in a number of different shapes and is not limited to the embodiment shown herein.

Figure 2:
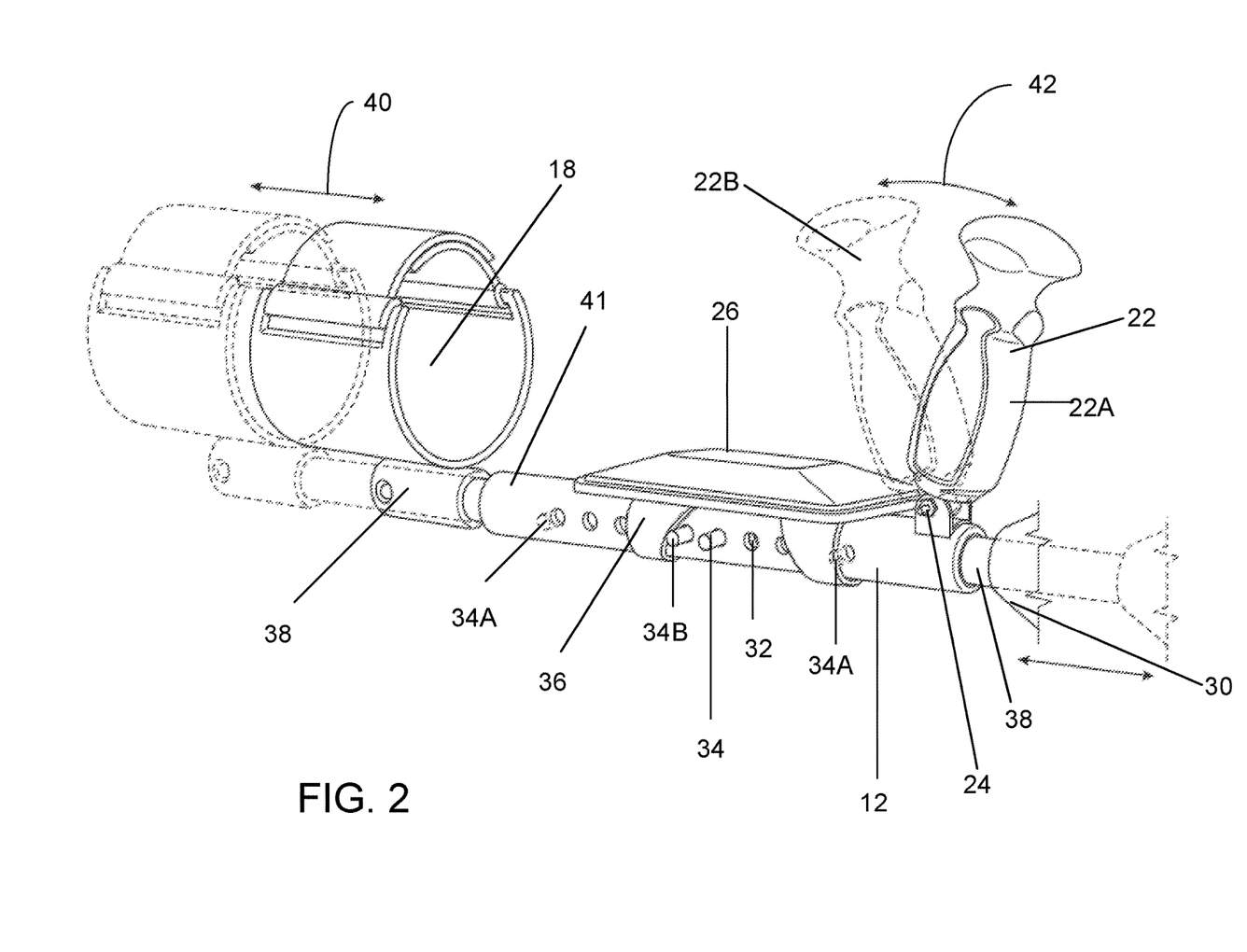
FIG. 2 is a side perspective view of the gardening tool shown in FIG. 1 illustrating adjustable positioning of features thereof.

FIG. 2 is a side perspective view of the gardening tool 10 shown in FIG. 1 illustrating an adapter mechanism. As discussed above, the position of the pad 26 can be adjusted along the elongated body 12. Elongated body 12 may include pull-pin holes 32 to adjust the position of the pad 26 to accommodate different user arm lengths. The user may quickly adjust the position of the pad 26 by pulling pins 34 from a first position 34A and pushing the pins 34 into a second position 34B. While the above discussion refers to pulling and pushing the pins 34, it should be understood that, in some embodiments, pull-pins 34 are spring loaded. Accordingly, the user may release the pull-pin 34 and the force of the loaded spring will push the pin 34 into the hole 32. Furthermore, in some embodiments, the pad 26 may have one or more coupling members 36 that limit the position of the pad 26 in accordance with the position of the pins 34. Alternatively, or additionally, the pad 26 may be movably mounted to the elongated body 12, and may slide along the elongated body when the push-pin 34 is removed. In illustrative embodiments, a single push-pin 34 may be used to lock in the position of the pad 26.

In some embodiments, the position of the arm attachment portion 18 is also adjustable. The arm attachment portion 18 may also using coupling members 36 in a manner similar to the pad 26, or it may be directly mounted to an extendable portion 38 of the elongated body 12 as shown. The arm attachment portion 18 may be rotated around the longitudinal axis of the elongated body 12. The arm attachment portion 18 may also be moved 40 along the longitudinal axis of the tool 10. The attachment portion 18, similar to the pad 26, may use the push-pins 34 and the push-pin holes 32 to fix the location and orientation of the attachment portion 18. To that end, extendable portion 38, at least part of which may fit within external housing 41 of the elongated body 12, may also have holes 32 through which push-pins 34 may be inserted.

The adapter mechanism 30 may also be mounted on extendable portion 38. In some embodiments, the extendable portions 38 on which the arm attachment portion 18 and the adapter mechanism 30 are mounted are not necessarily a single uniform piece. For example, each of the extendable portions 38 may move independently of the other. It should be understood that the mounting mechanism for the pad 26, the arm attachment portion 18, and the adapter mechanism 30 are all interchangeable. The above described embodiment is not intended to limit illustrative embodiments of the invention.

As described above, the handle 22 may be pivotally 42 adjustable around a pivot axis 24. In some embodiments, after the handle 22 is pivoted, the handle 22 may be locked in a specific pivot orientation. In some other embodiments, once locked, the handle 22 may have a limited pivot range. For example, when digging into soil with the tool 10, the handle 22 may be in position 22A as the user presses into the soil. When the user pulls back on the handle 22 to dig the soil out of the ground, the handle 22 may pivot towards position 22B. In some embodiments, the user can lock or loosen the pivoting 42 of the handle 22. The handle 22 may also be loosened so that it freely pivots.

FIGS. 3A-3D schematically show the adapter mechanism 30 of the gardening tool 10 in FIG. 1. As discussed above, the adapter mechanism 30 allows interchanging of tool heads 28. However, it should be understood that the adapter mechanism 30 allows for both attachment and release of tool heads 28. Specifically, the adapter mechanism 30 provides for the engagement and disengagement of tool heads 28 to the elongated body 12. In some embodiments, the disengagement and engagement of tool heads 28 is performed by the same adapter mechanism 30. Accordingly, adapter mechanism 30 may also be referred to as release mechanism 30.

Figure 3A:
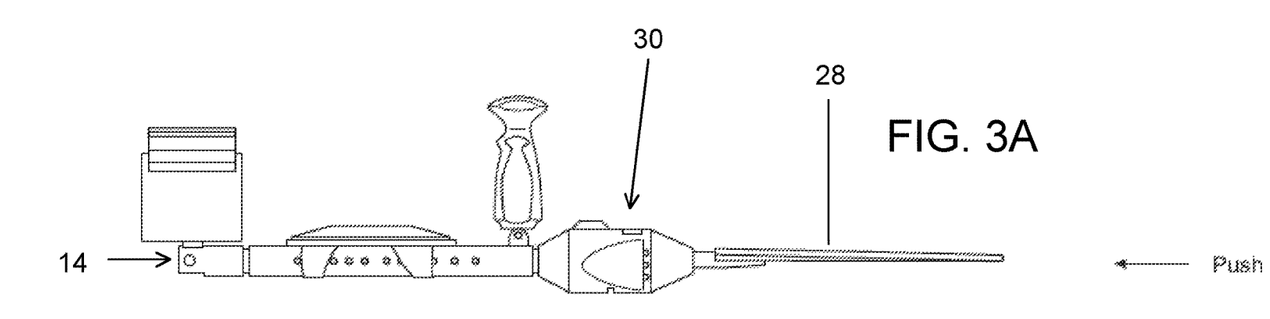
FIGS. 3A-3D are side views of an adapter mechanism of the gardening tool in FIG. 1.
Figure 3B:
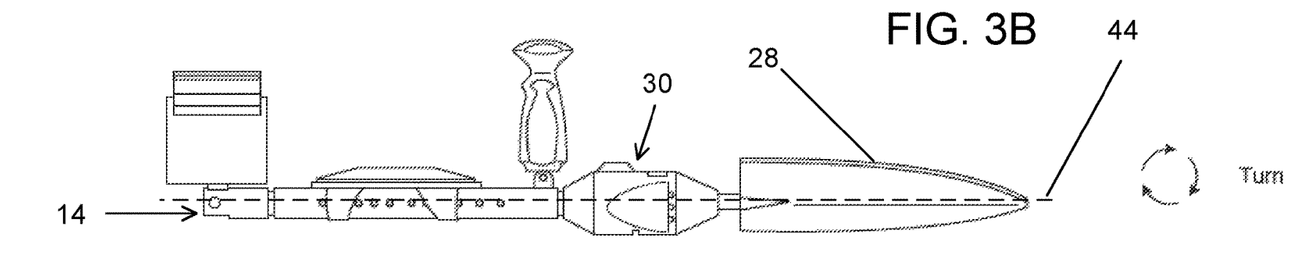
Figure 3C:
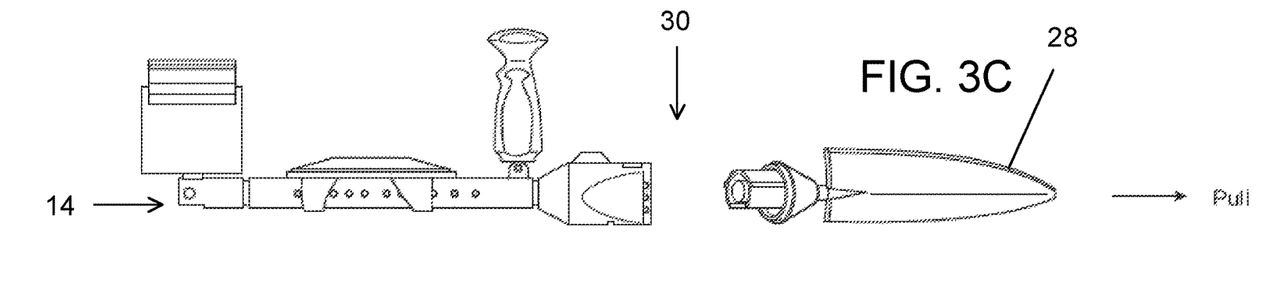

FIG. 3A shows the first step for activating the release mechanism 30. In some embodiments, the release mechanism 30 is spring loaded. Accordingly, the user begins by pushing the tool head 28 in towards the first end 14. FIG. 3B shows the second step for activating the release mechanism 30. The user turns the tool head 28 around the longitudinal axis 44 of the tool 10. FIG. 3C shows the last step for activating the release mechanism 30. The user then pulls the tool head 28. The internal spring that is compressed upon inserting the tool head 28 eases the effort needed to pull the tool head 28 from the elongated body 12. These three movements (shown in FIGS. 3A-3C) allow the user to quickly remove the currently engaged tool head 28. As described further below, in some embodiments, a release button may be used alone or in conjunction with these steps to release the tool head 28.

Figure 3D:
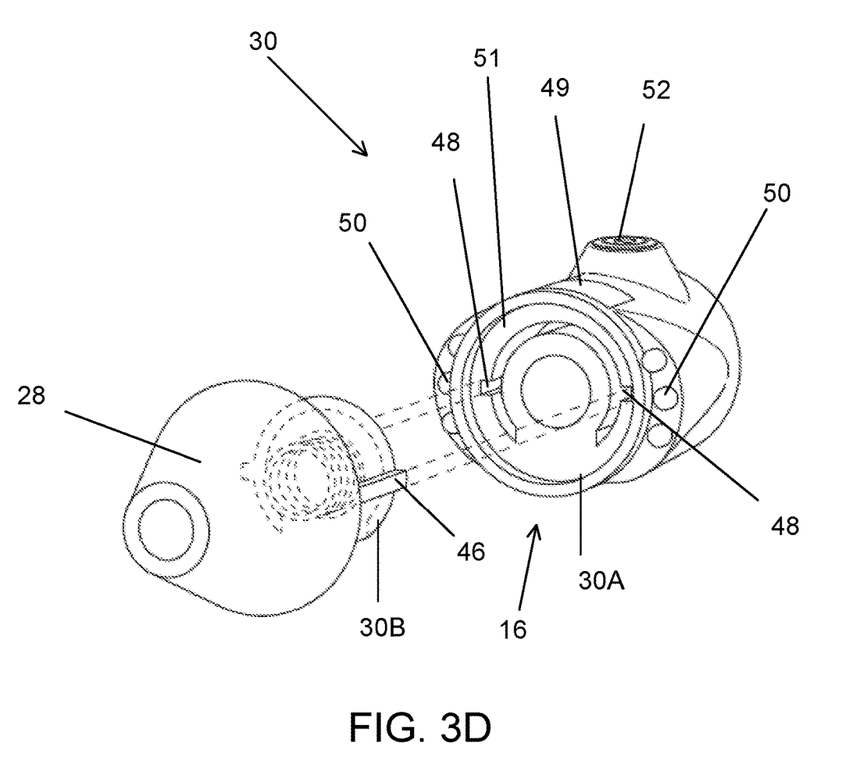

FIG. 3D schematically shows a detail of the adapter mechanism 30. In some embodiments, the adapter mechanism 30 has two parts: an elongated body portion 30A attached to the elongated body 12, and a tool head portion 30B attached to, or that attaches to, the tool head 28. In some embodiments, however, the adapter mechanism 30B may be unitary with the tool head 28.

To reinsert the tool head 28, or to insert a different tool head 28, the user merely presses the tool head 28 until it snaps into place on the elongated body 12. Specifically, the tool head portion 30B is pressed into the elongated body portion 30A until the tool head 28 snaps into place on the elongated body 12. In some embodiments, the adapter mechanism 30 has locking alignment projections 46 and recesses 48. In illustrative embodiments, to engage or disengage the tool head 28, the projections 46 and the recesses 48 have to be aligned.

The adapter mechanism 30 may be spring loaded. In illustrative embodiments, engaging the tool head portion 30B with the elongated body portion 30A begins by aligning the projections 46 and recesses 48, as shown in the figure. The tool head portion 30B is pressed into the elongated body portion 30A until the projections 46 pass lip 51. The tool head portion 30B is rotated with respect to the elongated body portion 30A, or vice-versa, until the projections 46 and recesses 48 are no longer aligned. The spring loaded adapter mechanism 30 then presses the projections 46 against the inside of lip 51. Furthermore, some embodiments have grooves (not shown) on the inside of the lip 51 configured to accept the projections 46. The spring presses the projections 46 against the grooves and mitigates unintended disengagement of the tool head portion 30B that might otherwise occur when the tool head 28 experiences rotational forces. In illustrative embodiments, to disengage the tool head portion 30B, the tool head 28 is pressed into the elongated body portion 30A to counter the force of the spring. The tool head portion 30B is then rotated with respect to the elongated body portion 30A (e.g., in a direction opposite the rotation used to engage the tool head portion), or vice-versa, until projections 46 are once more aligned with recesses 48. The tool head portion 30B may then be pulled from the elongated body portion 30A. The spring loaded adapter mechanism 30 may also help disengage the tool head 28 by pushing the tool head portion 30B away from the elongated body portion 30A.

Furthermore, in some embodiments, the second end 16 has lights 50. The lights 50 may include LED lights 50. A user may simply press the power button 52 to operate the on and off switch for the lights 50. In some embodiments, the tool 10 may have lights 50 to assist gardeners who prefer to work in the cooler temperatures of dusk and dawn. In darker conditions, the lights 50 may be of assistance while aligning the projections 46 with the recesses 48. In some embodiments, a button 49 may be an adapter release button 49. In such embodiments, the user presses the adapter release button 49 prior to releasing the tool head 28 as described with reference to FIGS. 3A-3C. The adapter release button 49 is coupled to a locking mechanism that prevents release of the tool head 28 from the adapter mechanism 30 until the button 49 is pressed. In illustrative embodiments, the adapter release button 49 may prevent accidental release of tool heads 28. However, in some other embodiments, simply pressing the button 49 ejects the tool head 28, without the need for the steps described with reference to FIGS. 3A-3C.

Figure 4A:
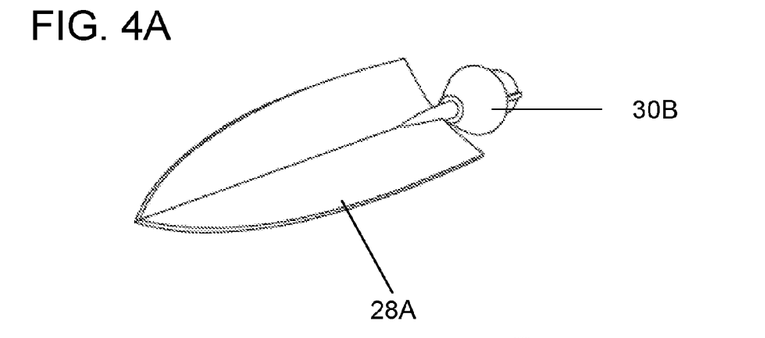
FIGS. 4A-4C are perspective views showing various tool heads in accordance with illustrative embodiments of the invention.
Figure 4B:
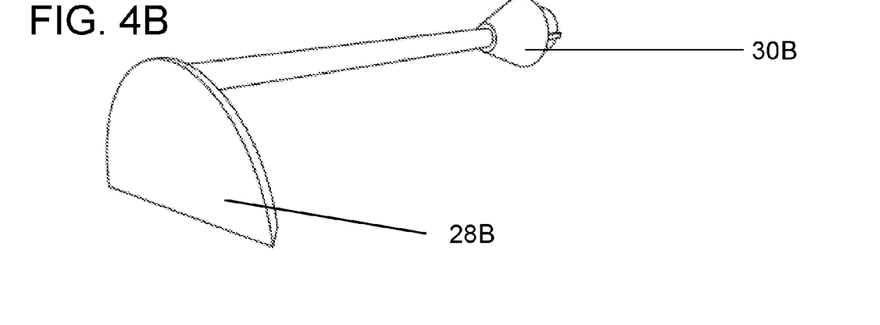
Figure 4C:
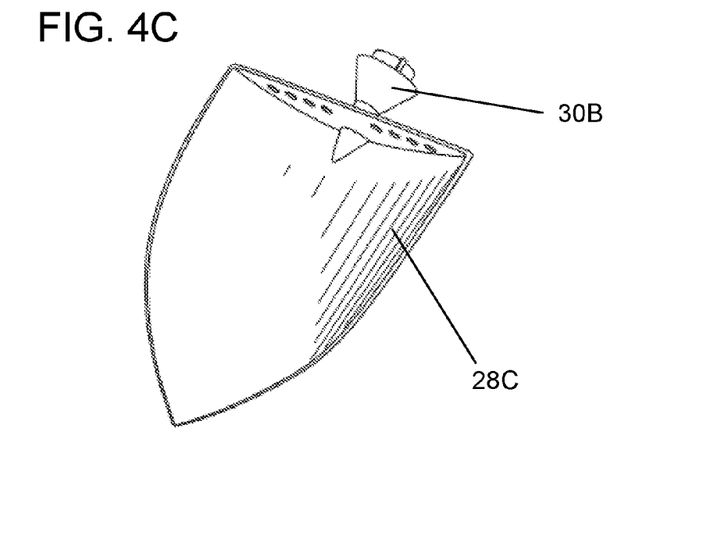

FIGS. 4A-4C are perspective views showing various tool heads 28A-28C in accordance with illustrative embodiments of the invention. As shown, a variety of gardening tool heads 28 may be used with the gardening tool 10. For example, FIG. 4A shows a trowel tool head 28A. FIG. 4B shows a garden hoe tool head 28B. FIG. 4C shows a shovel tool head 28C. The illustrated tool heads 28A-28C are merely exemplary and not intended to limit illustrative embodiments of the invention. As shown, the tool heads 28A-28C are not attached to an elongated body 12. However, all three tool heads 28A-28C may be attached to the elongated body 12 using the attachment mechanism 30. Accordingly, all three tool heads 28A-28C may be interchanged on the elongated body 12. Specifically, a user may engage the adapter mechanism 30 by pressing the tool head portion 30B into the elongated body portion 30A to couple the tool head 28A-C to the elongated body 12. The user may disengage the tool head 28 as described above with reference to FIGS. 3A-3C.

Figure 5:
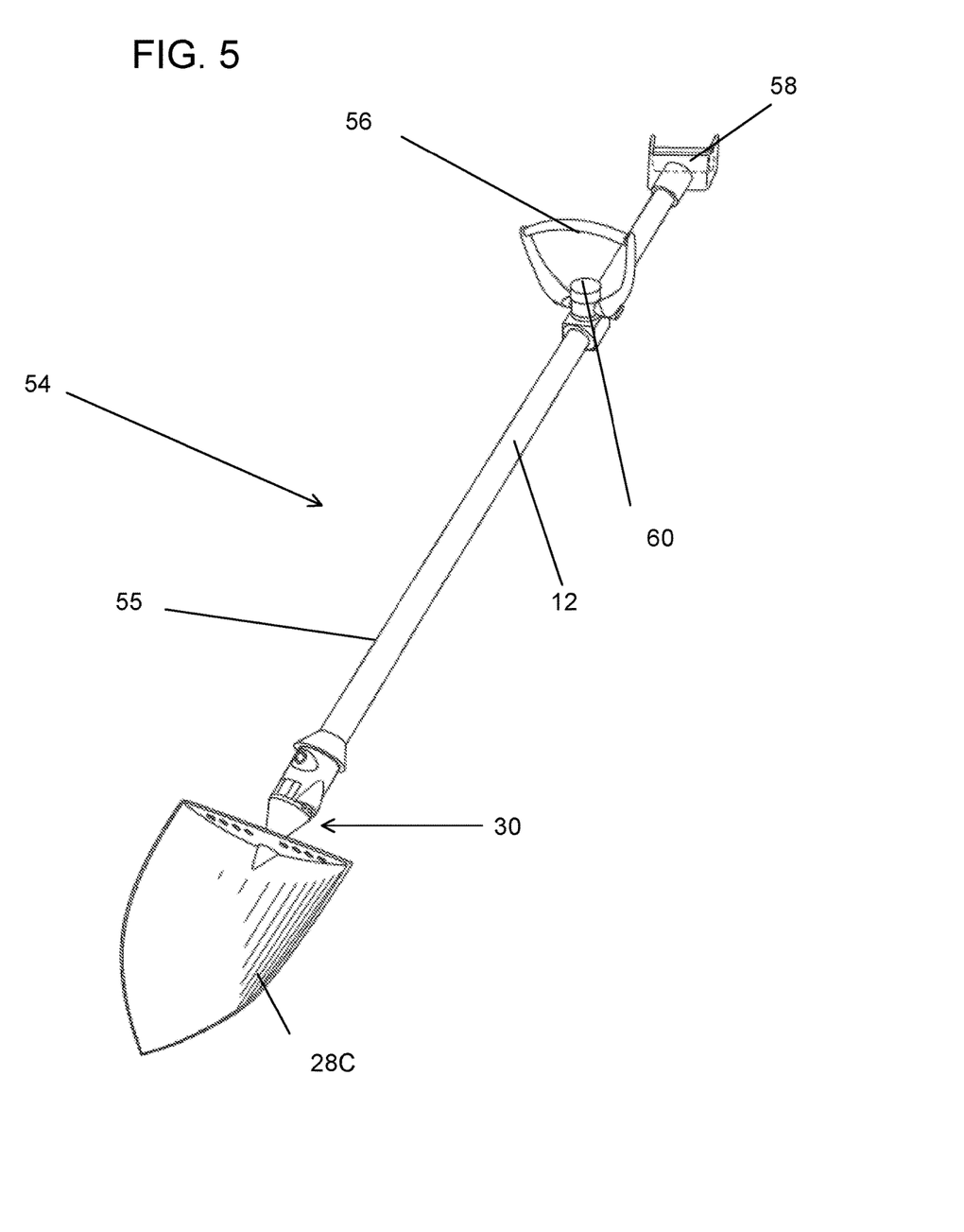
FIG. 5 is a perspective view of an alternative embodiment of a gardening tool in accordance with the invention.

FIG. 5 is a perspective view of an alternative embodiment of the gardening tool 10 in accordance with the invention. In illustrative embodiments, the gardening tool 10 functions as a shovel 54. Unlike the earlier gardening tool 10, the shovel 54 is gripped with both hands. Accordingly, in some embodiments, the elongated body 12 of the shovel 54 is longer to accommodate both hands, and to increase leverage. In some embodiments, gardening tool 10 may have an adjustable elongated body 12 that us extendable.

In some embodiments, the shovel 54 has many of the same features as gardening tool 10 described above. For example, the shovel 54 has an adapter mechanism 30. The adapter mechanism 30 may be used with any other tool heads 28, such as those described with reference to gardening tool 10. Therefore, while the figure shows a shovel 54, it should be understood that any tool head 28 may be used in accordance with the two-handed model referred to herein as the shovel 54. While not shown, the shovel 54 may have the handle 22, the arm attachment portion 18, and/or the pad 26. The previous discussion regarding these features also applies to the shovel 54. Furthermore, the elongated body 12 functions in a similar manner to the elongated body 12 described above, and may have holes 32 to accommodate push-pins 34.

The shovel 54 has an extended handle 56. The extended handle 56 extends longitudinally from shaft 55. Usually, when grasping a shovel 54, the user has one hand near the rear of the shovel 54, and another hand near the middle of the shovel 54. The extended handle 56 provides an easily accessible grip to the user, so that the user does not have to reach to the middle of the shaft 55. Because the extended handle 56 provides a better reach, users do not have to bend as much as with traditional shovels. Additionally, the extended handle 56 may be adjusted in multiple directions. For example, in some embodiments, adjusting the position of the handle 56 on the shaft 55, or the angle of the handle 56, may be performed with a single movement. The center cap 60 is pulled upwards, which unlocks the handle 56 from the shaft 55. Unlocking the handle 56 allows the user to pivot the handle 56 back and forth, to move the handle 56 longitudinally on the shaft (e.g., slide up and down the shaft), or to rotate the handle 56 (e.g., up to 360 degrees). The user then releases the center cap 60, and the handle 56 is locked in position. The shovel 54 may use push-pins 34 and holes 32 as described above to accommodate different locations for the handle 56 along the shaft 55. Accordingly, the user may adjust the extendable handle 56 to whatever grip is most comfortable for them.

Additionally, in some embodiments, the shovel 54 has a rear adjustable handle 58 that provides a better and more comfortable grip than the blunt rear of a standard shovel. The rear adjustable handle 58 is able to rotate 360 degrees, allowing the user to adjust the shovel to best fit their needs. The orientation of the rear adjustable handle 58 may also be locked. Adjusting the handles 56 and 58 allows the user to create better leverage for gardening (e.g., digging or carrying material).

Although the above discussion discloses various exemplary embodiments of the invention, it should be apparent that those skilled in the art can make various modifications that will achieve some of the advantages of the invention without departing from the true scope of the invention. For example, although a push-pin system has been described for moving various components of the tool, it should be understood that other methods for attaching components to the tool are known by those in the art.

What is claimed is:

1. A gardening tool comprising:
   an elongated body having a first end and a second end;
   an arm attachment portion coupled to the elongated body, the arm attachment portion being disposed substantially at the first end of the elongated body and configured to at least partly wrap around a user's forearm;
   a pivotally adjustable handle coupled to and extending substantially laterally from the elongated body, the handle being disposed between the first end and the second end of the elongated body;
   a pad coupled to the elongated body, the pad being disposed between the handle and the arm attachment portion and being separate from and unconnected to the arm attachment portion, a position of the pad being adjustable along a longitudinal axis of the elongated body relative to the handle and arm attachment portion, wherein positions of the handle, the pad and the arm attachment portion along the longitudinal axis of the gardening tool are all separately adjustable; and
   an adapter mechanism disposed substantially at the second end of the elongated body, the adapter mechanism being configured to allow for interchanging of gardening tool heads.

2. The gardening tool as defined by claim 1 wherein the adapter mechanism is spring loaded.

3. The gardening tool as defined by claim 1 wherein the adapter mechanism comprises a first portion configured to couple with the tool head and a second portion configured to couple with the elongated body.

4. The gardening tool as defined by claim 1 wherein the adapter mechanism is configured to release the tool head when the user applies:
   a force on the tool head directed substantially towards the first end,
   a rotational force on the tool head directed substantially around the longitudinal axis of the elongated body, and
   a force on the tool head directed substantially away from the first end.

5. The gardening tool as defined by claim 4 wherein the adapter mechanism is configured to release the tool head when the user presses a release button.

6. The gardening tool as defined by claim 1 wherein the arm attachment portion comprises a strap.

7. The gardening tool as defined by claim 6 further comprising Velcro.

8. The gardening tool as defined by claim 1 wherein the length of the elongated body is adjustable.

9. The gardening tool as defined by claim 8 wherein adjusting the length of the elongated body moves at least one of the arm attachment portion, the handle, the pad, or the adapter mechanism relative to the others.

10. The gardening tool as defined by claim 1 further comprising LED lights.

11. The gardening tool as defined by claim 1 wherein a pivot position of the first handle is lockable.

12. A gardening tool comprising:
- an elongated body having a first end and a second end;
- a first handle pivotally coupled to and extending substantially laterally from the elongated body, a pivot angle between a direction that the first handle extends from the body and the body being adjustable, the first handle being disposed between the first end and the second end of the elongated body, a position of the first handle being adjustable along a longitudinal axis of the elongated body;
- a second handle being configured to be gripped by a hand and being disposed substantially at the first end;
- a pad coupled to the elongated body, the pad being disposed between the first handle and the second handle, a position of the pad along the longitudinal axis of the elongated body being adjustable relative to and separately from the first handle; and
- an adapter mechanism disposed at the second end of the elongated body, the adapter mechanism being configured to allow for interchanging of gardening tool heads.

13. The gardening tool as defined by claim 12 wherein the second handle is adjustable.

14. The gardening tool as defined by claim 12 wherein the second handle is substantially rigid.

\* \* \* \* \*